(12) United States Patent
Chang et al.

(10) Patent No.: US 7,479,263 B2
(45) Date of Patent: Jan. 20, 2009

(54) METHOD FOR SCAVENGING MERCURY

(75) Inventors: Shih-ger Chang, El Cerrito, CA (US); Shou-heng Liu, Kaohsiung (TW); Zhao-rong Liu, Beijing (CN); Naiqiang Yan, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 360 days.

(21) Appl. No.: 11/101,713

(22) Filed: Apr. 7, 2005

(65) Prior Publication Data

US 2006/0057044 A1 Mar. 16, 2006

Related U.S. Application Data

(60) Provisional application No. 60/560,904, filed on Apr. 9, 2004.

(51) Int. Cl.
*B01D 53/64* (2006.01)
(52) U.S. Cl. .......................... 423/210; 95/134
(58) Field of Classification Search ................ 423/210; 95/134
See application file for complete search history.

(56) References Cited

U.S. PATENT DOCUMENTS

| | | | |
|---|---|---|---|
| 5,435,980 A | 7/1995 | Felsvang et al. | |
| 5,695,726 A | 12/1997 | Lerner | |
| 5,900,042 A | 5/1999 | Mendelsohn et al. | |
| 6,136,281 A | 10/2000 | Meischen et al. | |
| 6,258,334 B1 | 7/2001 | Gadkaree et al. | |
| 6,284,208 B1 | 9/2001 | Thomassen | |
| 6,372,187 B1 | 4/2002 | Madden et al. | |
| 6,375,909 B1 | 4/2002 | Dangtran et al. | |
| 6,808,692 B2 | 10/2004 | Oehr | |
| 6,878,358 B2 | 4/2005 | Vosteen et al. | |
| 6,953,494 B2 * | 10/2005 | Nelson, Jr. | 95/134 |
| 6,960,329 B2 * | 11/2005 | Sellakumar | 423/210 |
| 6,969,494 B2 | 11/2005 | Herbst | |
| 6,974,564 B2 * | 12/2005 | Biermann et al. | 423/210 |
| 2003/0161771 A1 * | 8/2003 | Oehr | 423/210 |
| 2004/0109800 A1 | 6/2004 | Pahlman et al. | |
| 2008/0107579 A1 * | 5/2008 | Downs et al. | 423/210 |

OTHER PUBLICATIONS

Ding, et al., "One-step Synthesis of Sulfur Dichloride Using Sulfur and Chlorine", Fine Chemicals, vol. 16 No. 3, Jun. 1999, p. 62.
Rosser, et al., "Development of a large-scale distillation process for purifying crude sulphur dichloride. I. Laboratory Scale Investigations", J. App. Chemistry, 1960, vol. 10, 229-237.
Unknown, "Mercury—emissions and control", IEA Coal Research, The Clean Coal Center (Feb. 2002).
Livengood, et al., "Removal of Mercury from Coal-Combustion Flue-Gas", twelfth Annual International Pittsburgh Coal Conference, Pittsburgh, PA (Sep. 11-15, 1995).

* cited by examiner

*Primary Examiner*—Timothy C Vanoy
(74) *Attorney, Agent, or Firm*—Fulbright & Jaworski L.L.P.

(57) ABSTRACT

Disclosed herein is a method for removing mercury from a gas stream comprising contacting the gas stream with a getter composition comprising bromine, bromochloride, sulphur bromide, sulphur dichloride or sulphur monochloride and mixtures thereof. In one preferred embodiment the getter composition is adsorbed onto a sorbent. The sorbent may be selected from the group consisting of flyash, limestone, lime, calcium sulphate, calcium sulfite, activated carbon, charcoal, silicate, alumina and mixtures thereof. Preferred is flyash, activated carbon and silica.

20 Claims, 6 Drawing Sheets

US 7,479,263 B2

METHOD FOR SCAVENGING MERCURY

CROSS-REFERENCE TO RELATED APPLICATIONS

This application claims priority to U.S. Provisional Patent Application 60/560,904 filed on Apr. 9, 2004, the contents of which are incorporated by reference in its entirety.

STATEMENT OF GOVERNMENTAL SUPPORT

This invention was made during work supported by U.S. Department of Energy under Contract No. DE-AC03-76SF00098. The government has certain rights in this invention.

BACKGROUND OF THE INVENTION

The U.S. Environmental Protection Agency (EPA) has estimated that annual emissions of mercury from human activities in the United States were 158 tons during the period of 1994-1995. Approximately 87% of these emissions were from combustion sources. Coal-fired power plants in the U.S. were estimated to emit 48 tons of mercury per year into the air during this period, or about one-third of anthropogenic emissions. The mercury in the flue gas from the power plants has been found in a variety of chemical forms, including elemental mercury and oxidized mercury compounds. A study performed by Electric Power Research Institute (EPRI) indicated that approximately 40% of the mercury emissions from coal-fired power plants were in the oxidized form. The oxidized mercury compounds, such as mercuric chloride, are water soluble and can be removed in a wet scrubber system. However, elemental mercury is not water soluble and easily escapes the wet scrubber.

In addition to the difference in solubility, elemental mercury has higher vapor pressure than the oxidized mercury. Consequently, elemental mercury does not adsorb on sorbents or unburned carbon as readily as oxidized mercury.

Mercury causes environmental and ecological problems. Elemental mercury can be transported over long distance in the atmosphere because of its insolubility, whereas oxidized mercury deposited near the point of emission as a result of its dissolution in fog, cloud, or rain. Once the mercury has deposited on land or water, it can transform into methyl mercury, an organic form, and thereby enter the food chain. Humans are most likely to be exposed to methyl mercury through consumption of fish.

Specific technologies for the control of mercury such as waste incinerators are already proving successful. However, these controls cannot be transposed to coal-fired power plants as the flue gas conditions are different. Flue gas streams from coal-fired power plants are much larger than those from incinerators and the mercury concentrations are much lower, 0.01 ppm in coal-fired plants, at least an order of magnitude lower than incinerator flue gases. Also, the residence time of the flue gases in the air pollution control systems of waste incinerators is longer.

The injection of a sorbent such as activated carbon appears to be one of the most favorable options for mercury control. The sorbent would be injected upstream of existing particulate control devices such as ESP or baghouses. Mercury capture by an injected sorbent depends on the sorbent capacity and mass transfer to the sorbent surface. The capacity and reactivity are affected by temperature and mercury concentration. However, the addition of a sorbent would obviously increase the particulate load in an ESP or baghouse. The total cost of using activated carbon is estimated to add 24$/kW to the plant capital cost and would increase the cost of electricity in the USA by 23%.

Gadkaree et al. U.S. Pat. No. 6,258,334 claimed a method of making and using an activated carbon having sulfur chemically bonded to remove mercury from fluid stream.

Madden et al. U.S. Pat. No. 6,372,187 used an alkaline sorbent injection for mercury control. Alkaline sorbents at low stoichiometric molar ratios of alkaline earth or alkali metal to sulfur of less than 1.0 are injected into a power plant system to remove at least between about 40% and 60% of the mercury content from combustion flue gases.

Felsvang et al. U.S. Pat. No. 5,435,980 patented a method for the removal of mercury from flue gas of coal-fired power plants by adding a chloride or chlorine containing material to the coal before of during the combustion or by injecting gaseous HCl into the flue gas upstream before a spray drying system.

Mendelsohn et al. U.S. Pat. No. 5,900,042 claimed the use of an oxidizing solution to convert elemental mercury to soluble mercury compounds. The aqueous oxidizing solution claimed includes aqueous iodine solution, aqueous bromine solution, aqueous chlorine solution, aqueous chloric acid solution, and combination therefore. This solution is impractical because of the aqueous nature of the oxidizing solution. The oxidant will hydrolyze to form acidic compounds that are not selective for Hg oxidation.

Dangtran et al. U.S. Pat. No. 6,375,909 patented a process of injecting calcium chloride into the combustor and lowering the flue gas temperature in sufficient time to enhance oxidation of mercury and nitrogen oxides into more soluble products prior to their absorption in a wet scrubber.

On Mar. 15, 2005 the EPA promulgated new mercury regulations requiring coal burning power plants to decrease the mercury emissions from the estimated 48 tons a year to 31.3 tons in 2010, 27.9 tons in 2015 and 24.3 tons in 2020. These numbers correspond to a reduction from the current emission levels of 34.8, 41.9 and 49.4 in 2010, 2015 and 2020 respectively.

Cost will be a very important factor in deciding which of the many mercury control options currently under development is chosen for commercialization. Most estimates of the cost of the impending mercury control in the USA assume that activated carbon will be the control method of choice. For a 45% control level, the US DOE has estimated that the annual costs would be between $1.08 and $3.02 billion per year (based on costs for activated carbon). This is based on a cost of 25,000-70,000 $/lb (11,300-31,800 $/kg) of mercury removed.

To solve the afore mentioned problems the present invention provides a method using a getter composition that oxidizes volatile and/or insoluble Hg to non-volatile and/or soluble Hg compounds that are then readily removed from gas streams.

BRIEF SUMMARY OF THE INVENTION

In one embodiment the present invention discloses a method for removing mercury from a gas stream comprising contacting the gas stream with a getter composition comprising bromine, bromochloride, sulphur bromide, sulphur dichloride or sulphur monochloride and mixtures thereof. In one preferred embodiment the getter composition is adsorbed onto a sorbent. The sorbent may be selected from the group consisting of flyash, limestone, lime, calcium sulphate, calcium sulfite, activated carbon, charcoal, silicate, alumina and mixtures thereof. Preferred is flyash, activated carbon and silicate. Especially preferred is activated carbon. The adsorbed sorbent is collected in a baghouse or electrostatic precipitator.

In another embodiment the getter composition is in a gaseous state. The getter composition may be introduced as a liquid and allowed to or forced to vaporize prior to contact with Hg.

DETAILED DESCRIPTION OF THE PREFERRED EMBODIMENTS

Figure 1:
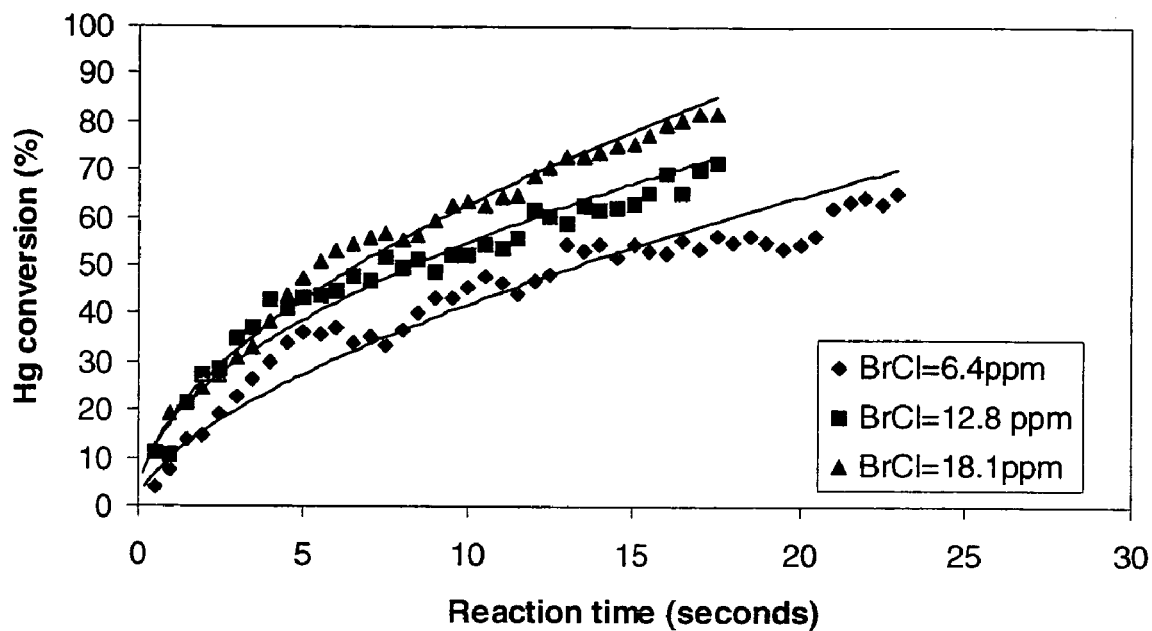
FIG. 1 represents the oxidation of mercury vapor by bromochloride gas with reaction time.

By "removing mercury" it is meant that at least some of any mercury present in a gas stream be oxidized by the getter compositions and methods described herein.

By "gas stream" it is meant any volume of material that at least partially comprises a gas with at least some amount of mercury therein. This includes industrial gas streams such as flue gases in coal fired power plants.

By "contacting the gas stream" it is meant the process of delivering the getter composition to the elemental mercury. Processes are known in the art for this. The invention contemplates that this includes the process of delivering solid sorbent materials to the gas stream containing Hg. This may include providing sorbent from a hopper to a screw feeder than to a pneumatic feed line which is supplied by a blower or compressor which will enable the sorbent to be delivered to the gas stream in an effective amount. The sorbent may also be distributed by feeders which are known in the art. The invention contemplates the use of a dry sorbent feeder, a sorbent slurry feeder, sorbent filter cake feeder, and a feeder system. The invention also contemplates the use of a gas-solid reaction unit for reacting the mercury in the gas stream with the getter composition and may be selected from the group including, but not limited to, a fluidized bed, a pseudo-fluidized bed, a reaction column, a fixed bed, a pipe/duct reactor, a moving bed, a serpentine reactor, a cyclone, a multiclone, or combinations thereof.

By "getter composition" it is meant a composition comprising bromine, bromochloride, sulphur bromide, sulphur dichloride or sulphur monochloride and mixtures thereof. It is understood that the getter composition may be in a gas state, may be in a liquid state and vaporized prior to contacting the Hg, and may be adsorbed onto a sorbent. Sometimes the getter composition is referred to as an oxidant or scavenger.

By "effective amount" it is meant that quantity of getter composition that will scavenge a desired portion of Hg. The amount that is "desired" will of course depend on conditions and may be high in some instances and low in other circumstances.

By "sorbent" it is meant a material onto which the getter composition may be adsorbed. These materials are known in the art and non limiting examples include flyash, limestone, lime, calcium sulphate, calcium sulfite, activated carbon, charcoal, silicate, alumina and mixtures thereof. Preferred is activated carbon. The sorbent is preferably used in finely divided form, preferably having an average particle diameter in the range of from about 1-100 microns, with 10-70 microns being preferred and 20-40 microns being especially preferred. The sorbent may be in the form of pellets or a monolithic body. The sorbent may be flakes, or platelets or fibers. In one preferred embodiment the sorbent is a polymeric material that is functionalized to assist in the adsorption of the getter composition. Metal oxides such as disclosed in US Published patent application 20040109800, the contents of which are hereby incorporated by reference in its entirety are also contemplated. The amount of getter composition adsorbed onto the sorbent may vary depending on the desired end use, the use of catalysts such as flyash. Optimization of the amount of getter composition to use may be readily determined by one having ordinary skill in the art. Sorbent coating methods are known in the art and the coating of the sorbent used herein is not within the scope of this invention.

By "adsorbed onto a sorbent" it is meant that association between the sorbent and molecule that is normally associated with this structure in the art.

By "liquid" it is meant to include a non-aqueous material not in the solid or gas phase having at least a liquid component comprising at least bromine, bromochloride, sulphur bromide, sulphur dichloride or sulphur monochloride and/or mixtures thereof. This may be a solution, a mixture or a colloidal suspension, depending on solubility parameters that one of skill in the art will recognize. Liquid water is detrimental to the reaction chemistry and is not desired. However, water vapor may be tolerated.

By "distributing a liquid" it is meant the process of delivering a liquid by pumping, spraying or other means known in the art such that the liquid will substantially vaporize just prior to contact with the mercury. One skilled in the art will appreciate that this will include fluid nozzles, pressurized nozzles, ultrasonic nozzles, a rotary atomizer or combinations thereof. In one non-limiting embodiment the nozzle will spray a mist of getter composition into the gas stream (flue gas, for example) so that the elemental mercury is oxidized into a soluble mercuric compound.

A halogen containing oxidant, including bromine, bromochloride, sulfur bromide, sulfur dichloride, and/or sulfur monochloride, in gas or liquid form, is injected into a waste gas stream to oxidize elemental mercury vapor. In one embodiment of the present invention the oxidation takes place in gas phase. In another embodiment the oxidation may take place on flyash in an electrostatic precipitator or baghouse. The oxidized form of mercury can subsequently be removed by the dissolution in an aqueous gas absorber or by the adsorption on sorbents in a baghouse or electrostatic precipitator. The excess oxidant can react with water and be captured by a wet $SO_2$ scrubber or ESP/baghouse located downstream from the injection point. This new method can be used to control mercury emissions from coal-fired power plants in a simple and cost effective manner.

A method has been discovered for removing elemental mercury from waste gas streams. This method involves the injection of a halogen containing oxidant, including bromine, bromochloride, sulfur bromide, sulfur dichloride, and/or sulfur monochloride, in gas or liquid form, into waste gas to oxidize the elemental mercury to mercuric and/or mercurous compounds. The mercuric and/or mercurous compounds are water soluble and can be removed in an aqueous scrubber. Also, the mercuric/mercurous compounds are much less volatile than the elemental mercury and can be removed in a baghouse or an ESP by the adsorption on sorbent. This method is effective for the oxidation of mercury in flue gas also containing CO, NO and/or $SO_2$ because of its selectivity in oxidizing elemental mercury vapor over the CO, NO and/or $SO_2$.

In a preferred embodiment of the present invention sulphur dichloride is added in the gas phase. One unexpected advantage of this invention is that the product of the chemistry may be a stable insoluble mercury sulfide. This advantageous results means that upon disposal into solid waste streams, the mercury sulfide will not leach back into the environment.

In a preferred embodiment of the present invention sulphur monochloride is adsorbed onto a sorbent. One unexpected advantage of this invention is that the product of the chemistry may be a stable insoluble mercury sulfide. This advantageous results means that upon disposal into solid waste streams, the mercury sulfide will not leach back into the environment.

The sulfur chlorides used by the present invention may be prepared by any method known in the art. Non limiting prior art methods are disclosed in Ding W., Xiao C. L., Li B. L., Zhang, R. M., Lu C. X. One-step Synthesis of Sulfur chloride Using Sulfur and Chlorine, Fine Chemicals, 16, 60-62, 1999 and Rosser, R. J., Whitt, F. R. Development of a Large-Scale Distillation and Process for Purifying Crude Sulfur Dichloride. J. Appl. Chem., 10, 229-237, 1960, the contents of which are both incorporated by reference in their entirety.

In one embodiment it is preferable to use bromine in the gaseous form.

It is understood that the present invention contemplates wet scrubbing techniques for further mercury removal in addition to contacting the gas stream with getter compositions as described herein. For example, subsequent to oxidation of Hg to soluble mercuric compounds by getter compositions, the treated gas stream may travel to a wet scrubber. In the wet scrubber the soluble mercuric compounds and other constituents are treated with aqueous solutions and/or slurry of calcium carbonate, sodium carbonate, magnesium carbonate and sodium hydroxide to remove the soluble compounds. Treated flue gas may then be vented from the wet scrubber.

The present invention contemplates that other wet flue gas desulphurization systems such as flue gas desulphurization spray dryers or a wet electrostatic precipitator (ESP) may be used in combination with the present method and getter composition.

EXAMPLE 1

Mercury Scavenging Using Bromochloride

Mercury gas was mixed with bromochloride gas in a reactor. The decay of the mercury gas concentration as a function of reaction time was monitored by cold vapor atomic absorption spectroscopy. In this non-limiting embodiment the mercury gas and gas oxidants were introduced into the reactor by injection with a syringe. Initially, the reactor was evacuated nitrogen gas saturated with mercury gas was injected with a syringe to the reactor to reach a pressure of about 250 torr. The pressure in the reactor is raised to 500 torr with nitrogen. A volume of known concentration of bromochloride gas in nitrogen was injected by a syringe into the reactor before the pressure was quickly brought to 760 torr (1 atm) with nitrogen. The initial bromochloride gas concentrations studied were 6.4 ppm, 12.8 ppm, and 18.1 ppm. The initial mercury concentrations were 0.18 ppm in all experiments. The half life (50% conversion) of mercury vapor was measured to be 14 sec with 6.4 ppm bromochloride gas, 8.5 sec with 12.8 ppm of bromochloride gas, and 6.5 sec with 18.1 ppm of bromochloride. The results are shown in FIG. 1.

EXAMPLE 2

Mercury Scavenging Using Sulfur Dichloride

Figure 2:
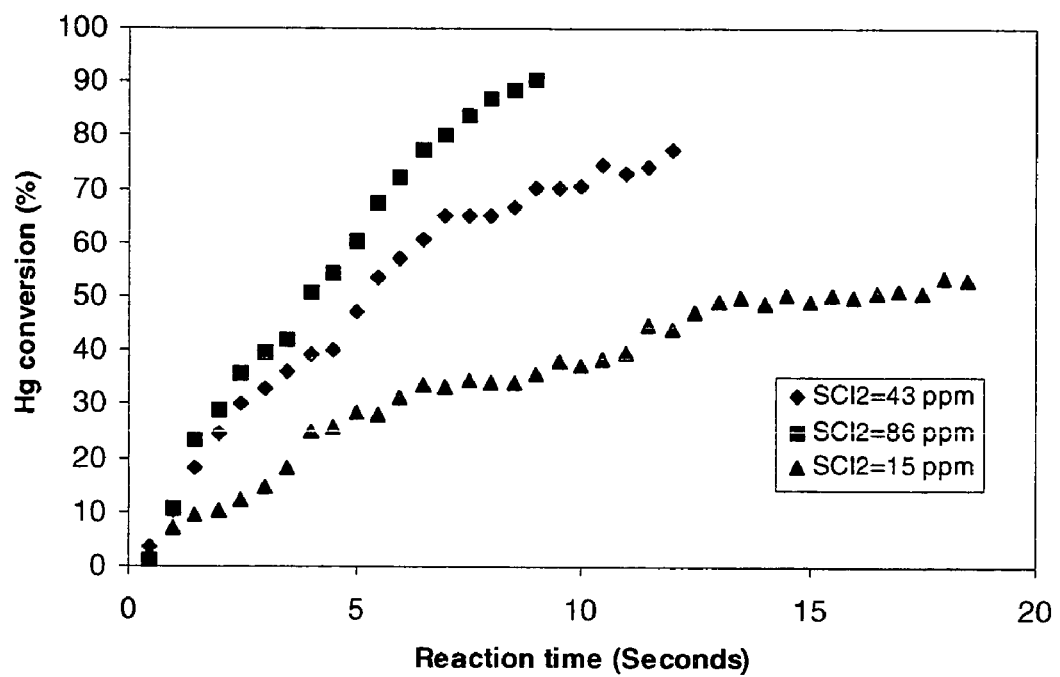
FIG. 2 represents the oxidation of mercury vapor by sulfur dichloride gas with reaction time.
Figure 3:
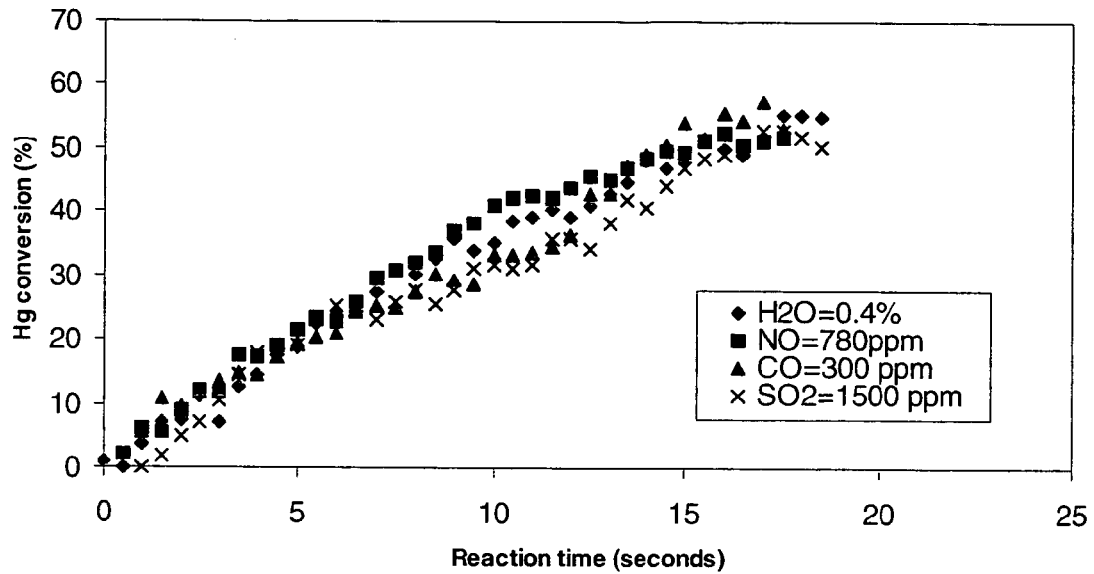
FIG. 3 represents the effect of $H_2O$, NO, CO, or $SO_2$ gas on the oxidation of mercury by sulfur dichloride gas as a function of time.

Mercury gas was mixed with sulfur dichloride gas in a reactor. The decay of the mercury gas concentration as a function of reaction time was monitored by cold vapor atomic absorption spectroscopy. In this embodiment, the mercury gas and sulfur dichloride gas were introduced into the reactor by injection with a syringe. A volume of nitrogen gas saturated with mercury gas was injected with a syringe to reach a pressure of about 250 torr. The pressure in the reactor was raised to 500 torr with nitrogen. A volume of known concentration of sulfur dichloride gas in nitrogen was injected by a syringe into the reactor before the pressure was quickly brought to 760 torr (1 atm) with nitrogen. The initial sulfur dichloride gas concentrations studied were 15 ppm, 43 ppm, and 86 ppm. The initial mercury concentrations were 0.18 ppm in all experiments. The half life (50% oxidation) of mercury vapor was measured to be 14 sec with 15 ppm sulfur dichloride gas, 5 sec with 43 ppm of sulfur dichloride gas, and 4 sec with 86 ppm of sulfur dichloride gas. FIG. 2 shows the results.

EXAMPLE 3

Simulation of Waste Gas Components on the Scavenging of Mercury

To demonstrate the effect of different waste gas components ($H_2O$, NO, CO, and $SO_2$) on the oxidation rate of mercury vapor by sulfur dichloride as a function of time at 24° C. experiments were performed mixing mercury gas with sulfur dichloride gas in the presence of different waste gas components in a reactor. The decay of the mercury gas concentration as a function of reaction time was monitored by cold vapor atomic absorption spectroscopy. The mercury gas, sulfur dichloride gas, and waste gas component were introduced into the reactor by injection with a syringe. The initial concentrations of mercury gas, sulfur dichloride, water vapor ($H_2O$), nitric oxide (NO), carbon monoxide (CO), and sulfur dioxide ($SO_2$) were 0.18 ppm, 15 ppm, 0.14%, 780 ppm, 300

EXAMPLE 4

Oxidation of Mercury by Sulfur Monochloride ($S_2Cl_2$) and Sulfur Dichloride ($SCl_2$)

Figure 4:
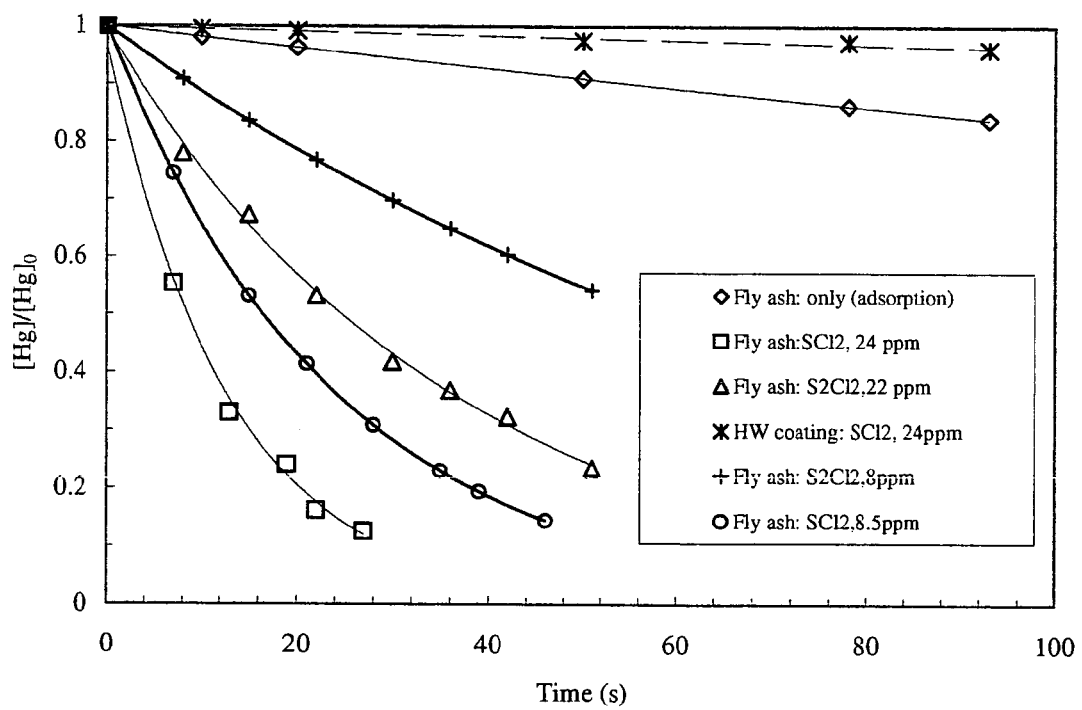
FIG. 4 shows the time dependent oxidation of mercury gas by sulfur monochloride and sulfur dichloride on flyash surface.

To make the getter composition, flyash was coated with sulfur monochloride and sulfur dichloride at 296±1° K and 1 atm. The flyash (size: 20-40 μm) was dispersed on the inner wall of a reactor using a halocarbon wax. The amount of fly ash used was 1.34 g. The weight percentages of $S_2Cl_2$ on flyash were 0.0013% and 0.0035% for 8 ppm and 22 ppm of $S_2Cl_2$, respectively. The weight percentages of $SCl_2$ on flyash were 0.0010% and 0.0026% for 8.4 ppm and 24 ppm of $SCl_2$, respectively. The initial concentration of mercury gas, $[Hg^0]_0$, in the reactor was 0.2 ppm. FIG. 4 shows the results.

EXAMPLE 5

Oxidation of Mercury Gas by Sulfur Monochloride and Sulfur Dichloride on Activated Carbon at 296±1° K and 1 Atm.

Figure 5:
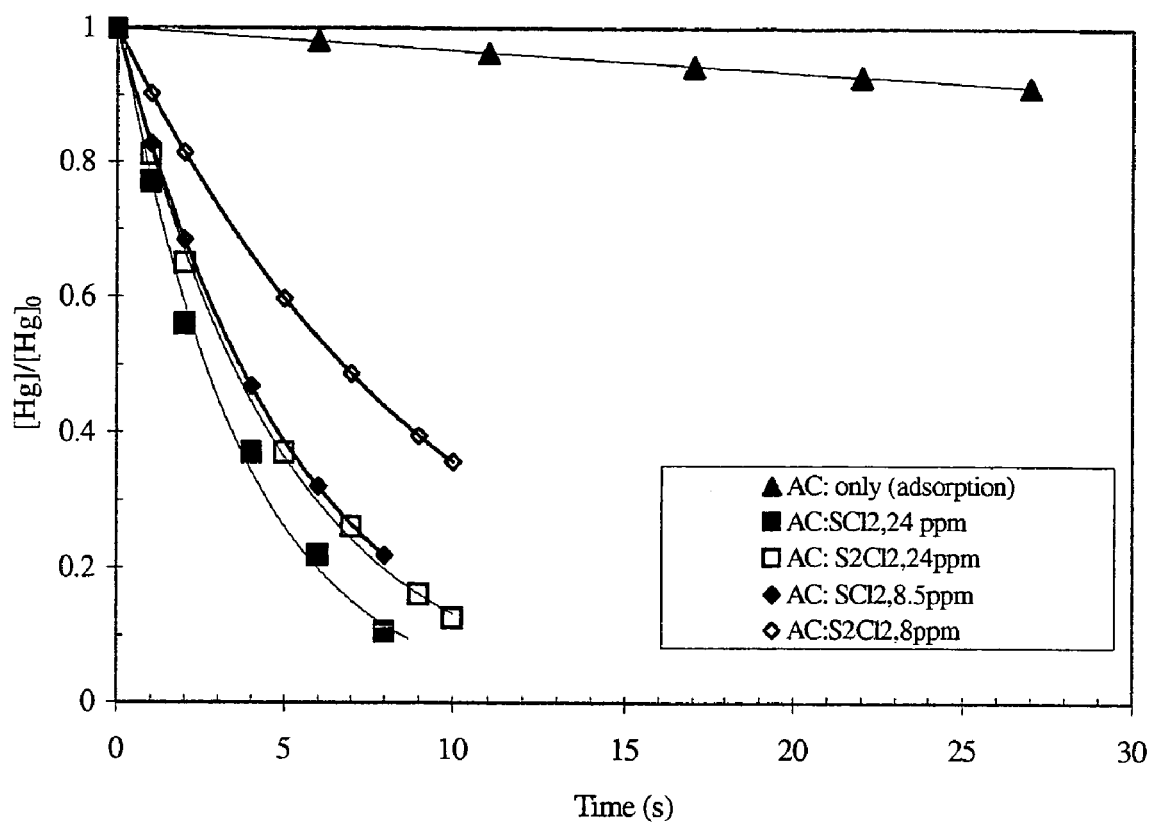
FIG. 5 shows the time dependent oxidation of mercury gas by sulfur monochloride and sulfur dichloride on activated carbon.

The activated carbon (size: 20-40 μm) was coated on the inner wall of a reactor. The amount of activated carbon employed was 0.36 g. The activated carbon was then exposed to adsorb oxidants. The weight percentages of ($S_2Cl_2$) on activated carbon were 0.0048% and 0.012% for 8 ppm and 22 ppm of ($S_2Cl_2$), respectively. The weight percentages of ($S_2Cl_2$) on activated carbon were 0.0037% and 0.0093% for 8.4 ppm and 24 ppm of ($S_2Cl_2$), respectively. The initial concentration of mercury gas, $[Hg^0]_0$, in the reactor was 0.2 ppm. FIG. 5 shows the results.

EXAMPLE 6

Oxidation of Mercury on with Adsorbed $S_2Cl_2$ on Activated Carbon as a Function of Temperature.

Figure 6:
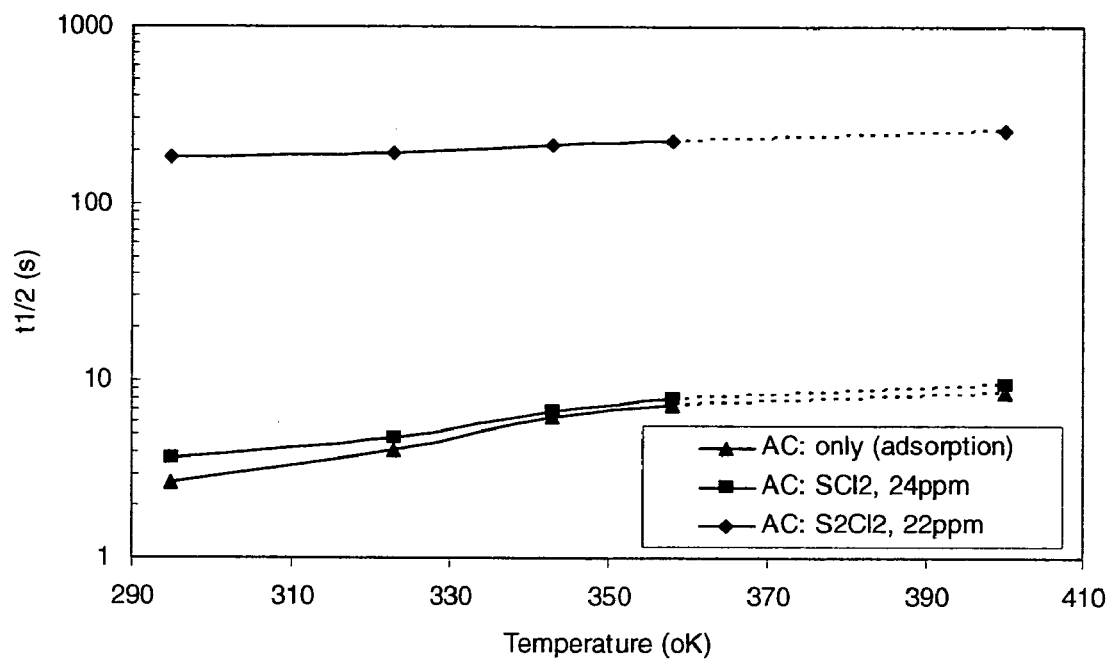
FIG. 6 shows the oxidation of 50% mercury by adsorbed sulphur monochloride, ($S_2Cl_2$) and sulphur dichloride ($SCl_2$) on activated carbon as a function of temperature.

The initial concentration of $Hg^0$ in the reactor was 0.2 ppm. The activated carbon (size: 20-40 μm) bearing sulfur chlorides was coated on the inner wall of a reactor using a halocarbon wax. The amount of activated carbon used was 0.36 g. The weight percentage of $(SCl)_2$ on activated carbon was 0.012% for 22 ppm of $(SCl)_2$. The weight percentage of $SCl_2$ on activated carbon was 0.0093% for 24 ppm of $SCl_2$. FIG. 6 shows the results.

EXAMPLE 7

The Time Needed to Oxidize 50% (Half Life, $t_{1/2}$) of Mercury Gas on Flyash Bearing Sulfur Monochloride or Sulfur Dichloride as a Function of Temperature.

The initial concentration of mercury gas, $Hg^0$, in the reactor was 0.2 ppm. The flyash (size: 20-40 μm) was coated on the inner wall of a reactor using a halocarbon wax. The amount of flyash used was 1.34 g. The weight percentage of $S_2Cl_2$ on flyash was 0.0035% for 22 ppm of $S_2Cl_2$.

Figure 7:
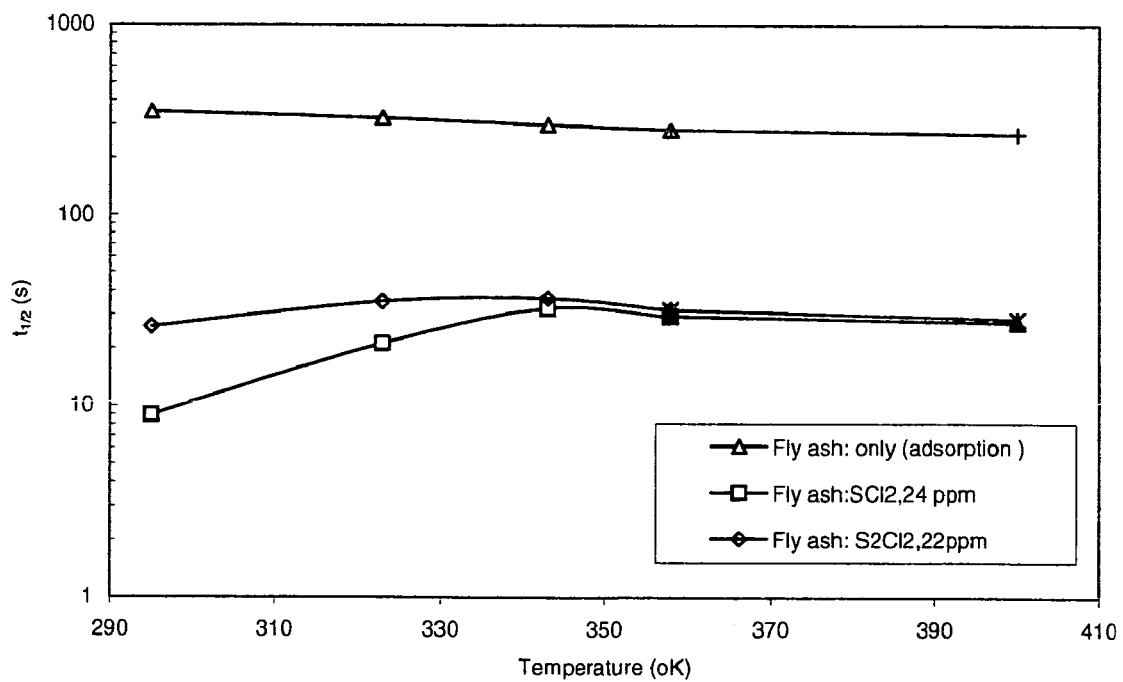
FIG. 7 shows the time needed to oxidize 50% (half life, $t_{1/2}$) of mercury gas on flyash bearing sulfur monochloride or sulfur dichloride as a function of temperature.

The weight percentage of $S_2Cl_2$ on flyash was 0.0026% for 24 ppm of $S_2Cl_2$. FIG. 7 shows the results.

EXAMPLE 8

The Effect of Waste Gas Components on the Half-Life ($t_{1/2}$) of Mercury Gas, Hg, Oxidation on Fly Ash and Activated Carbon Bearing Sulfur Dichloride at 296° K and 358° K were Studied.

Figure 8:
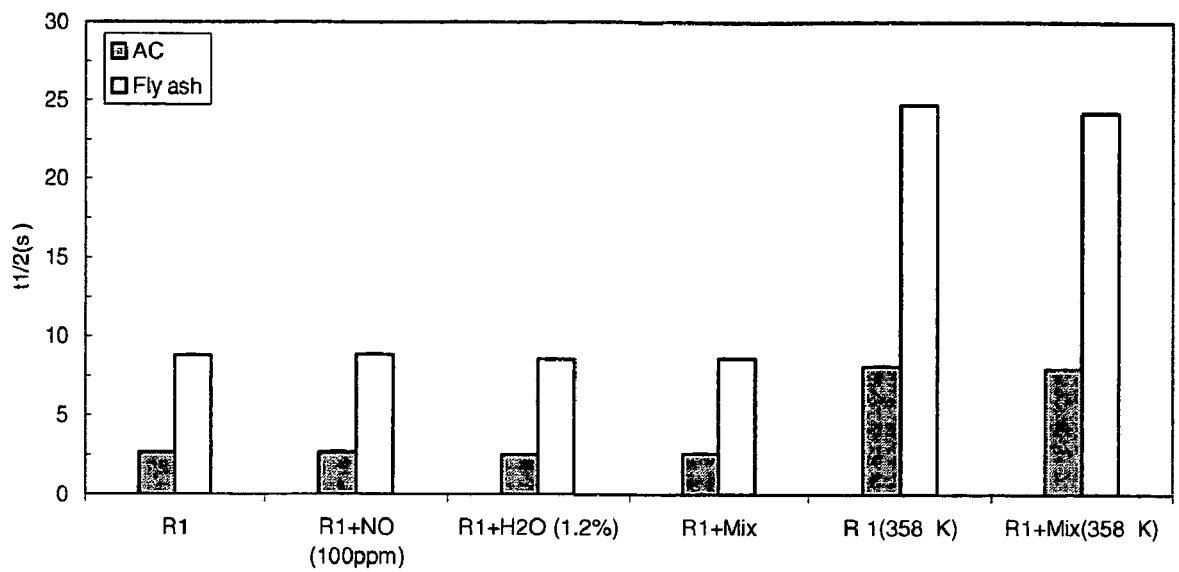
FIG. 8 shows the effect of waste gas components on the half-life ($t_{1/2}$) of mercury gas, $Hg^0$, oxidation on fly ash and activated carbon bearing sulfur dichloride.

Waste gas conditions studied include NO (100 ppm), $H_2O$ (1.2% volume), and a simulated flue gas, Mix (1200 ppm $SO_2$+120 ppm CO+100 ppm NO+1.2% $H_2O$+7% $O_2$+$N_2$ the balanc Fly ash or activated carbon (20-40 μm) was coated on the inner surface of a reactor using a halocarbon wax. The amount of fly ash and activated carbon was 0.36 g and 1.34 g, respectively. The concentration of $SCl_2$ was 24 ppm, and the percentages of $SCl_2$ on fly ash and activated carbon was 0.0026% and 0.0093%, respectively. The initial concentration of mercury gas, $Hg^0$, in the reactor was about 0.2 ppm. The results are shown in FIG. 8.

EXAMPLE 9

The Effect of Waste Gas Components on the Half-Life of $Hg^0$ Oxidation on Fly Ash and Activated Carbon Bearing Sulfur Monochloride at 296° K and 358° K.

Figure 9:
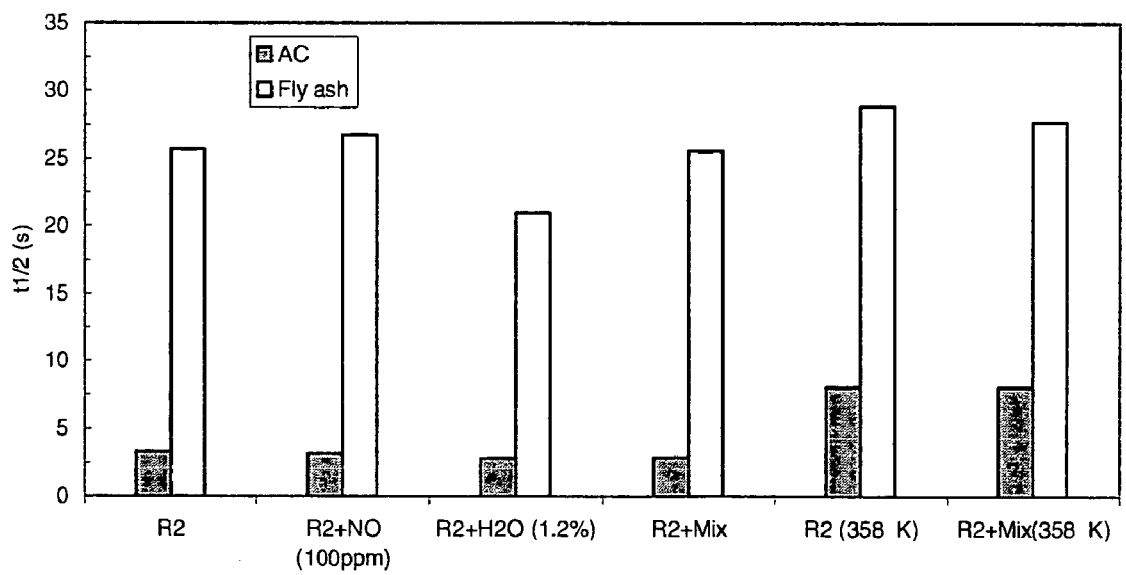
FIG. 9 shows the effect of waste gas components on the half-life of $Hg^0$ oxidation on fly ash and activated carbon bearing sulfur monochloride.

Waste gas conditions studied include NO (100 ppm), $H_2O$ (1.2% volume), and a simulated flue gas, Mix (1200 ppm $SO_2$+120 ppm CO+100 ppm NO+1.2% $H_2O$+7% $O_2$+$N_2$ the balanc Fly ash or activated carbon (20-40 μm) was coated on the inner surface of a reactor using a halocarbon wax. The amount of fly ash and activated carbon was 0.36 g and 1.34 g, respectively. The concentration of $(SCl)_2$ was 22 ppm, and the percentages of $(SCl)_2$ on fly ash and activated carbon was 0.0035% and 0.012%, respectively. The initial concentration of $Hg^0$ in the reactor was about 0.2 ppm. The results are shown in FIG. 9.

EXAMPLE 10

Oxidation of Hg Using Bromine

Figure 10:
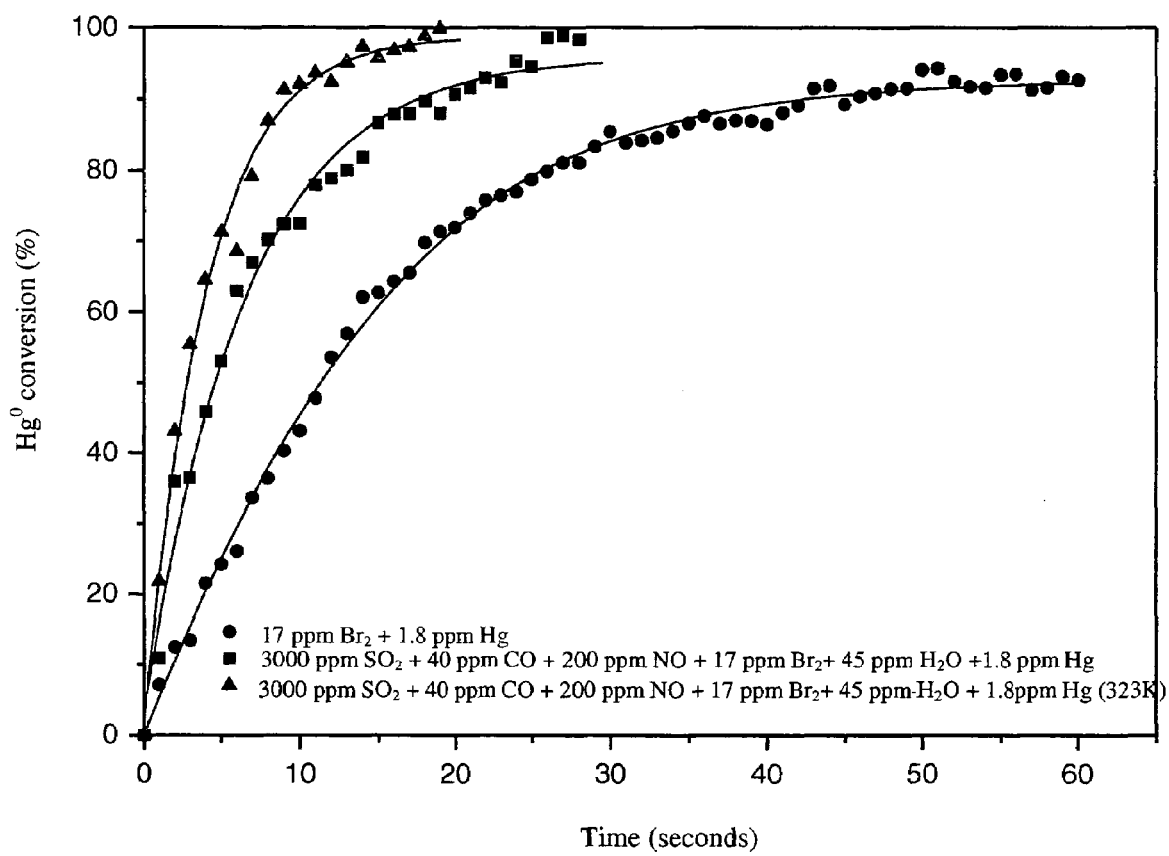
FIG. 10 the fraction of $Hg^0$ oxidized by $Br_2$ in a simulated flue gas, containing 3000 ppm $SO_2$, 200 ppm NO, 40 ppm CO, and 45 ppm $H_2O$. The initial concentration of $Br_2$ and $Hg^0$ was 17 ppm and 1.8 ppm, respectively.

The initial mercury vapor and bromine gas were 1.8 and 17 ppm, respectively. The concentration of the simulated flue gas composition was 3000 ppm $SO_2$, 200 NO, 40 ppm CO and 45 ppm $H_2O$. The results shown in FIG. 10 show that the fraction of mercury oxidized increases with increased temperature. The fraction of mercury oxidized was 77% and 92% at 21° C. and 50° C. respectively after 10 seconds of reaction time. The figure also shows that the net effect of a gas mixture containing $SO_2$, NO, $H_2O$, and CO was an enhancement of mercury oxidation rate by bromine gas.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

All patents, patent applications, and publications mentioned above are herein incorporated by reference in their entirety for all purposes. None of the patents, patent applications, and publications mentioned above are admitted to be prior art.

What is claimed is:

1. A method for removing mercury from a gas stream, comprising: contacting the gas stream with a getter composition that oxidizes volatile or insoluable Hg to non-volatile or soluble Hg, wherein said material is in a gaseous state prior to contact with the volatile or insoluble mercury in the gas stream.

2. A method according to claim 1, wherein the getter composition comprises a halogen.

3. A method for removing mercury from gas stream, comprising: contacting the gas stream with liquid bromine, bromochloride, sulphur bromide, sulphur dichloride or sulphur monochloride to oxidize volatile or insoluble Hg to non-volatile or soluble Hg.

4. A method according to claim 1, wherein the getter composition comprises at least one of sulphur monochloride or sulphur dichloride.

5. A method according to claim 1, wherein the getter composition comprises at least one of bromochloride or sulphur bromide.

6. A method according to claim 1, wherein the getter composition comprises bromine, bromochloride, sulphur bromide, sulphur dichloride or sulphur monochloride and mixtures thereof.

7. A method for removing mercury from a gas stream, comprising: contacting the gas stream with a getter composition that oxidizes volatile or insoluable Hg to non-volatile or soluble Hg, the getter absorbed onto a sorbent selected from the group consisting of limestone, lime, calcium sulphate, calcium sulfite, silicate, alumina and mixtures thereof, wherein the getter composition comprises bromine, bromochloride, sulphur bromide, sulphur dichloride or sulphur monochloride and mixtures thereof.

8. A method according to claim 7, wherein the getter composition comprises halogen.

9. A method according to claim 7, wherein the getter composition is bromine.

10. A method according to claim 9, wherein the getter composition is bromine.

11. A method according to claim 7, wherein the sorbent is silicate.

12. A method according to claim 7, wherein the sorbent is collected in a baghouse or electrostatic precipitator.

13. A method according to claim 7, wherein the getter composition comprises at least one of sulphur monochloride or sulphur dichloride.

14. A method according to claim 7, wherein the getter composition comprises at least on of bromochloride or sulphur bromide.

15. A method for removing mercury from a gas stream, comprising: contacting the gas stream with a getter composition that oxidizes volatile or insoluable Hg to non-volatile or soluble Hg, the getter adsorbed onto a sorbent selected from the group consisting of carbonaceous materials and flyash and mixture thereof, wherein the getter composition comprises bromochloride, sulphur bromide, sulphur dichlorid, or sulphur monochloride and mixtures thereof.

16. A method according to claim 15, wherein the sorbent is carbonaceous.

17. A method according to claim 15, wherein the sorbent is flyash.

18. A method according to claim 15, wherein the getter composition is bromochloride.

19. A method according to claim 15, wherein the getter composition is sulphur bromide.

20. A method according to claim 15, wherein the getter composition is sulphur dichloride or sulphur monochloride.

* * * * *